US008718803B2

(12) United States Patent
Serra Julià

(10) Patent No.: US 8,718,803 B2
(45) Date of Patent: May 6, 2014

(54) METHOD FOR CALCULATING MEASURES OF SIMILARITY BETWEEN TIME SIGNALS

(75) Inventor: Joan Serra Julià, Barcelona (ES)

(73) Assignee: Universitat Pompeu Fabra (ES)

( * ) Notice: Subject to any disclaimer, the term of this patent is extended or adjusted under 35 U.S.C. 154(b) by 739 days.

(21) Appl. No.: 12/764,424

(22) Filed: Apr. 21, 2010

(65) Prior Publication Data

US 2011/0178615 A1 Jul. 21, 2011

(30) Foreign Application Priority Data

Apr. 23, 2009 (ES) .................................. 200901057

(51) Int. Cl.
*G06F 17/00* (2006.01)
*A63H 5/00* (2006.01)
*G10H 1/06* (2006.01)

(52) U.S. Cl.
USPC .................................. 700/94; 84/609; 84/623

(58) Field of Classification Search
CPC .................. G10H 2210/125; G10H 2210/061; G10H 2210/076; G10H 2240/131; G10H 2240/135; G10H 2240/141
USPC ............................... 700/94; 84/609, 623, 649
See application file for complete search history.

(56) References Cited

U.S. PATENT DOCUMENTS 4,204,114 A 5/1980 Shoemaker
5,497,468 A 3/1996 Tani
8,178,770 B2 * 5/2012 Kobayashi ...................... 84/613
2008/0010330 A1 1/2008 Ide
2008/0072741 A1 * 3/2008 Ellis ................................ 84/609
2009/0013855 A1 * 1/2009 Fujishima et al. .............. 84/604

FOREIGN PATENT DOCUMENTS

JP 1049680 A 2/1998

OTHER PUBLICATIONS

Serrà Julià, Joan, "Music Similarity Based on Sequences of Descriptors: Tonal Features Applied to Audio Cover Song Identification", Sep. 2007, Universitat Pompeu Fabra, pp. 5-6 and 79-99.*
J. P. Eckmann, S. O. Kamphorst, and D. Ruelle, Europhysics Letters 4, 973 (1987).
J. P. Zbilut, A. Giuliani, and C. L. Webber Jr., Physics Letters A 246, 122 (1998).
N. Marwan, M. Thiel, and N. R. Nowaczyk, Nonlinear Processes in Geophysics 9, 325 (2002).

(Continued)

*Primary Examiner* — Jesse Elbin
(74) *Attorney, Agent, or Firm* — Hess Patent Law Firm PLLC; Robert J. Hess

(57) ABSTRACT

A method for calculating measures of similarity between time signals, which includes:

acquiring and comparing data ($x_i$, $y_j$) of time signals (X, Y);

assigning a one or a zero to every two compared data ($x_i$, $y_j$), depending on the result of said comparison, creating a data set;

determining time sequences with said ones and zeros of the data set, each one being formed by consecutive sub-sequences of ones, separated by discontinuities of zeros;

selecting the highest result of accumulated results obtained for each sub-sequence, adding for each determined point i, j of value one said one to the accumulated result of maximum value, from among the accumulated results at a point i−1, j−1 of said sub-sequence, a point i−2, j−1 of a sub-sequence of a second time sequence, and a point i−1, j−2 of a sub-sequence of a third sequence.

19 Claims, 7 Drawing Sheets
(3 of 7 Drawing Sheet(s) Filed in Color)

(56) References Cited

OTHER PUBLICATIONS

F. Takens, Lecture Notes in Mathematics 898, 366 (1981) (http://link.springer.com/content/pdf/10.1007%2FBFb0091924.pdf).

H. Kantz and T. Schreiber, Nonlinear time series analysis (Cambridge University Press, 2004). (http://books.google.es/books?hl=en&lr=&id=RfQjAG2pKMUC&oi=fnd&pg=PR11&dq=5.%09H.+Kantz+and+T.+Schreiber,+Nonlinear+time+series+analysis+(Cambridge+University+Press,+2004).&ots=4Qj__-fRz85&sig=4oL4BOWR8TaEZZYZDTFwpJKftgw&redir__esc=y#v=onepage&q&f=false).

J. P. Zbilut and C. L. Webber Jr., Physics Letters A 171, 199 (1992).

C. L. Webber Jr. and J. P. Zbilut, Journal of Applied Physiology 76, 965 (1994).

L. L. Trulla, A. Giuliani, J. P. Zbilut, and C. L. Webber Jr., Physics Letters A 223, 255 (1996).

J. Serrà, E. Gómez, P. Herrera, and X. Serra, IEEE Trans. on Audio, Speech and Language Processing 16, 1138 (2008) (http://mtg.upf.edu/node/919).

Serrà, E. Gómez, and P. Herrera, IEEE CS Conference on the Use of Symbols to Represent Music and Multimedia Objects pp. 45-48 (2008).

J. Serrà, Master's thesis, Universitat Pompeu Fabra, Barcelona, Spain (2007), [Online]: http://mtg.upf.edu/node/536.

* cited by examiner

METHOD FOR CALCULATING MEASURES OF SIMILARITY BETWEEN TIME SIGNALS

FIELD OF THE ART

The present invention generally relates to a method for calculating measures of similarity between time signals, which comprises evaluating the level of similarity, in relation to one or more threshold values, of time-variable data of said signals, and performing a series of accumulated sums with the results of said comparisons, and particularly to a method which comprises compensating the possible differences in the speed of said time signals.

The invention is particularly applicable to the field of music information retrieval, and more particularly to the detection of performances or versions of one and the same musical piece.

PRIOR STATE OF THE ART

Calculating measures of similarity between different time signals in order to automatically determine how much they resemble or differ from one another for different purposes, depending on the nature of said time signals, is known.

For the purpose of performing said calculations, proposals are known in which the data relative to the time-variable magnitude of signals of interest, such as audio signals, are directly compared or where the comparison is made with respect to time series of descriptors representative of one or more characteristic aspects of said signals of interest, such as the known tonal descriptors in the case of audio signals. Some proposals combine the data relative to the magnitude of the signals of interest with those of said descriptors.

A known way of performing said comparisons is by means of a cross recurrence plot, or bivariate extension of the recurrence diagram or plot RP [J. P. Eckmann, S. O. Kamphorst, and D. Ruelle, Europhysics Letters 5, 973 (1987)], i.e., the so-called cross recurrence plot, or CRP [J. P. Zbilut, A. Giuliani, and C. L. Webber Jr., Physics Letters A 246, 122 (1998)], which seems to be the most suitable one for the analysis of time series of a diverse nature, particularly of time series of music descriptors, since the CRP is defined for signals of different lengths and can easily deal with variations in the time domain [N. Marwan, M. Thiel, and N. R. Nowaczyk, Nonlinear Processes in Geophysics 9, 325 (2002)].

It is likewise known that, given a single potentially multivariate signal x, the method of delay coordinates provides an estimation of the underlying dynamics in a reconstructed state space [F. Takens, Lecture Notes in Mathematics 898, 366 (1981) and H. Kantz and T. Schreiber, Nonlinear time series analysis (Cambridge University Press, 2004)].

An RP plot is a direct way of displaying similar state characteristics of one or several systems achieved in different times. For this purpose, two discrete time axes define a square matrix containing zeros and ones, typically displayed as white and black cells, respectively. Each black cell in the coordinates (i, j) indicates a recurrence, i.e., that a state in time i was similar to a state in time j. To that end, the main diagonal line of the RP plot is black, i.e., a sequence of black cells without disruptions.

Given a pair of signals x and y which are generally of different lengths, a CRP plot is constructed in the same way as an RP, but with the difference that in a CRP the two axes define a rectangular Ny×Nx matrix (where Nx and Ny are the number of points of the time series x and y, respectively). A CRP plot allows highlighting the state equivalences between both systems for different times. The elements (or cells) included in a CRP plot are generally indicated as $R_{i,j}$, and when they acquire a positive value, generally one, they are represented by means of a corresponding black cell, and by a white cell when their value is zero.

Generally, $R_{i,j}$ is conventionally defined by the following equation:

$$R_{i,j}=\Theta(\epsilon-\|x_i-y_j\|)$$

for i=1, . . . , $N_x$ and j=1, . . . , $N_y$, where $x_i$ and $y_j$ are representations (in the state space or in the temporal space) of two respective time signals during sampling windows i and j, respectively, where $\Theta(\bullet)$ is generally the Heaviside step function ($\Theta(z)=0$ if $z<0$ and $\beta(z)=1$ in any other case), and where $\epsilon$ is a threshold value or distance, also applicable when using the near neighbor method between the data of both signals [J. P. Eckmann, S. O. Kamphorst, and D. Ruelle, Europhysics Letters 5, 973 (1987)]. In relation to $\|\bullet\|$ this symbol refers to any rule, such as a Euclidean rule.

When a CRP plot is used to characterize different systems, the main diagonal of $R_{i,j}$ element is generally not black, i.e., the sequence of cells defining said diagonal include black and white cells, or in other words, a series of sub-sequences separated by discontinuities of one or more zeros, or white cells. Any diagonal trajectory of connected black cells represents the similar state sequences exhibited by both systems. When it is applied to time series of a descriptor, extracted, for example, from two musical pieces, such "trajectories of similarity" can reflect that one and the same musical portion was played in both songs. It must be observed that the recurrence quantification analysis (RQA) [J. P. Zbilut and C. L. Webber Jr., Physics Letters A 171, 199 (1992); C. L. Webber Jr. and J. P. Zbilut, Journal of Applied Physiology 76, 965 (1994); and L. L. Trulla, A. Giuliani, J. P. Zbilut, and C. L. Webber Jr., Physics Letters A 223, 255 (1996)] allows extracting other additional quantitative characteristics based on the density of recurrence points and on the linear structures in the RP and CRP plots, to characterize the dynamics on which the measured signals have been obtained.

One of said recurrence quantification analyses, described in N. Marwan, M. Thiel, and N. R. Nowaczyk, Nonlinear Processes in Geophysics 9, 325 (2002), considers the length $L_{max}$ of the longest diagonal, i.e., the longest sub-sequence of black cells, found in the RP or CRP plot, as indicative of the measures of similarity between both signals.

To that end, a series of accumulated sums of all the values, generally ones, of each sub-sequence are performed, and the one offering a higher result is selected from among said sums.

$L_{max}$ can be expressed as the maximum value of a cumulative plot L computed from the CRP plot. Initialize $L_{1,j}=L_{i,1}=0$ for i=1, . . . , $N_x$ and j=1, . . . , $N_y$, and then recursively apply:

$$L_{i,j}=\begin{cases} L_{i-1,j-1}+1 & \text{if } R_{i,j}=1 \\ 0 & \text{if } R_{i,j}=0 \end{cases} \quad (3)$$

for i=2, . . . , $N_x$ and j=2, . . . , $N_y$, where $L_{max}$ is defined as $L_{max}=\max\{L_{i,j}\}$ for i=1, . . . , $N_x$ and j=1, . . . , $N_y$.

$L_{max}$ provides interesting information about the local similarity of two time series, since, for example, the latter deals with structural changes between the two time series or signals to be compared, such as for example the one occurring when one and the same portion or a very similar portion of data can be included in different time sections between both signals, which causes a diagonal or sub-sequence of black cells, or of ones, which does not coincide with the main diagonal, to occur in the CRP plot. Applying $L_{max}$, said sub-sequence which does not coincide with the main diagonal is taken into account, particularly its accumulated value, therefore such structural changes do not affect the measure of similarity performed by means of $L_{max}$.

There are, nevertheless, other variations between the signals or series of time data which are not taken into account by $L_{max}$ or by any other recurrence quantification analysis measure known by the present inventors.

This is the case of the variations or deviations in the speed with which said signals or series of data evolve over time, referred to as tempo in the case of audio signals, which are represented in the CRP plot as black traces or sub-sequences, or of ones, with a curved or warped shape, which are not taken into account by any of said recurrence quantification analysis measures. Particularly, the cumulative plot L computed from the CRP plot does not include said curved or warped traces, so the existence thereof is ignored when calculating $L_{max}$, an erroneous result, i.e., a measure of low similarity, therefore occurring for two time series or signals which are actually very similar with a different speed or tempo.

SUMMARY OF THE INVENTION

It is necessary to offer an alternative to the state of the art which covers the gaps found therein and which provides a valid solution when measuring the similarity between two time series or signals evolving over time with different speeds.

To that end, the present invention provides a method for calculating measures of similarity between time signals, which comprises automatically performing the following known stages:

a) acquiring data $x_i$ of a first time-variable signal X and data $y_j$ of a second time-variable signal Y over part of or the entire duration of each signal;

b) comparing each of said data $x_i$ acquired from said first signal X with at least a part of said data $y_j$ acquired from said second signal Y to evaluate the level of similarity between them;

c) assigning a predetermined positive value, generally a unit value, to every two compared data $x_i$, $y_j$ if the result of said comparison is greater than a determined threshold, and a zero if it is less than said determined threshold, creating a data set with said positive values and said zeros ordered in time;

d) determining at least a first time sequence with at least part of said is predetermined positive values and said assigned zeros of said data set, formed by a series of consecutive sub-sequences of positive values, separated by discontinuities formed by one or more zeros;

e) obtaining a series of accumulated results for at least each of said consecutive sub-sequences, adding up the positive values included in at least each sub-sequence; and f) selecting the highest result from among said accumulated results obtained in said stage e), and establishing said selected result as indicative of the level of similarity between said two signals.

Unlike conventional methods, the method proposed by the present invention comprises compensating possible differences in the speed of said signals X, Y, or in part of them. To that end, the method comprises carrying out said stage e), obtaining an accumulated result for each determined point i, j of a positive value, of each of said sub-sequences, adding said positive value to the accumulated result of maximum value, from among at least the following three accumulated results obtained in an analogous manner:

an accumulated partial result at an immediately previous point i−1, j−1 of said sub-sequence, an accumulated result at a point i−2, j−1 of a sub-sequence of a second time sequence, and an accumulated result at a point i−1, j−2 of a sub-sequence of a third time sequence.

Depending on the embodiment of the method proposed by the present invention, the data $x_i$ and $y_j$ of the signals X and Y are relative directly to the time-variable magnitude of said signals X and Y, or to time series of one or more descriptors representative of one or more characteristic aspects of said signals X and Y, such as the known tonal descriptors in the case of audio signals, or to a combination of both.

For one embodiment, said data set is a cross recurrence plot CRP, said data being recurrence data $R_{i,j}$, which for one embodiment are conventionally obtained as has been described in the previous section, or for another preferred embodiment are obtained taking into account the possible reciprocity, or the absence thereof, existing when performing said comparison of said stage b) taking either of said signals X, Y as a reference.

For said embodiment in which the data set is a cross recurrence plot, said first time sequence determined in said stage d) corresponds to a diagonal of black and white cells, i.e., of ones and zeros, respectively, such as the main diagonal of the CRP plot, said consecutive sub-sequences being each of the segments of black cells or ones forming part of the same diagonal. Different examples of CRP plots applied to different time signals are illustrated in the attached figures and will be duly described below.

To quantify the length of the curved or warped traces caused by the indicated speed differences, the method proposed by the present invention comprises computing a cumulative plot S from the CRP plot.

Initialize $S_{1,j}=S_{2,j}=S_{i,1}=S_{i,2}=0$ for $i=1, \ldots, N_x$ and $j=1, \ldots, N_y$, and then recursively apply:

$$S_{i,j} = \begin{cases} \max\{S_{i-1,j-1}, S_{i-2,j-1}, S_{i-1,j-2}\} + 1 & \text{if } R_{i,j} = 1 \\ 0 & \text{if } R_{i,j} = 0 \end{cases} \quad (4)$$

for $i=3, \ldots, N_x$ and $j=3, \ldots, N_y$.

The method proposed by the invention provides a new recurrence quantification analysis measure parameter $S_{max}$, which can be expressed as the maximum value of the cumulative plot S, i.e.,:

$$S_{max}=\max\{S_{i,j}\} \text{ for } i=1, \ldots, N_x \text{ and } j=1, \ldots, N_y,$$

the value of which corresponds to the length, or accumulated result, of the longest curved trace in the CRP plot, i.e., of the longest curved sub-sequence of ones or black cells, the accumulated result of which will be selected in said stage f).

The method comprises, for one embodiment, carrying out all the described stages for determining, in d), a plurality of time sequences, in a manner similar to the determination of said first sub-sequence, for obtaining, in e), a series of accumulated results for each sub-sequence of each time is sequence, and performing said stage f) for selecting the highest result from among all the accumulated results obtained in stage e). In other words, the method comprises taking into account all the diagonals of black cells included in the CRP plot.

In relation to the aforementioned reciprocity when obtaining, for one embodiment, the recurrence elements or data $R_{i,j}$, the method comprises, in said stage b), also comparing each of said data $y_j$ acquired from said second signal Y with at least a part of said data $x_i$ acquired from said first signal X to evaluate the level of similarity between them.

The method particularly comprises defining $R_{i,j}$ according to the following equation:

$$R_{i,j}=\Theta(\epsilon_i^x-\|x_i-y_j\|)\cdot\Theta(\epsilon_j^y-\|x_j-y_i\|) \quad (2)$$

for i=1, . . . , $N_x$ and j=1, . . . , $N_y$, where in this case unlike the conventional equation for calculating $R_{i,j}$ described in the State of the Art section, two threshold values or distances $\epsilon_i^x$ and $\epsilon_j^y$ are used, which are adjusted such that a predetermined maximum percentage of neighbors k is used for both $x_i$ and $y_j$. Thus, the maximum number of inputs or elements of positive value in each row and column of the CRP matrix never exceeds $k\times N_y$, or $k\times N_x$, respectively.

The present inventors have seen that the use of a fixed percentage of near neighbors offers better results than those obtained by means of using a fixed threshold value.

The discontinuities or disruptions between sub-sequences occur due to various causes, for example, when the signals to be analyzed are audio signals, or more particularly cover versions of a song, musicians occasionally skip some chords of the original song, or part of its melody, which causes short disruptions in otherwise coherent traces in the CRP plot. Furthermore, for the particular case that the data $x_i$ and $y_j$ correspond to time series of a tonal descriptor of audio signals, specifically of the HPCP (harmonic pitch class profiles) descriptor, these disruptions can be caused by the fact that the HPCP characteristics can contain an energy which is not directly associated with a tonal audio content.

For one embodiment of the method proposed by the invention, for each sub-sequence starting after a discontinuity, the method comprises starting the operation of adding up its positive values which offers an accumulated result for said sub-sequence, independently of the accumulated result or results of one or more sub-sequences prior to said discontinuity, i.e., as is carried out to calculate Lmax, where each discontinuity between two consecutive sub-sequences sets the "counter" to zero before commencing the accumulated count of the second sub-sequence starting after the discontinuity.

In order for said discontinuities to not affect an accumulated count so negatively, particularly when they are not very long, i.e., they are formed by a small number of zeros, the method proposed by the present invention comprises, for a preferred embodiment, alternative to the one described in the previous paragraph, for each sub-sequence starting after a discontinuity, starting the operation of adding up its positive values (generally ones) which offers an accumulated result for said sub-sequence, taking into account at least the accumulated result of a sub-sequence prior to said discontinuity.

The method particularly comprises starting the operation of adding up positive values which offers an accumulated result for said sub-sequence subsequent to a discontinuity, from a value of penalized accumulated result obtained upon applying at least one penalty to said accumulated result of the prior sub-sequence, belonging to the same sequence as said subsequent sub-sequence, or to another alternative time sequence.

Although the type of penalty to be applied can of a very diverse nature, said penalty generally comprises subtracting a determined value from said accumulated result of the prior sub-sequence.

The method comprises, for each zero of said discontinuity found at a determined point i, j, obtaining said value of said penalized accumulated result by subtracting a determined value from at least the accumulated result of the prior sub-sequence, at a point i−1, j−1 immediately before said zero. This case is only applicable when there are no curved or warped traces in the CRP plot, or it is considered that their existence is not too relevant.

In contrast, for the most preferred case in which the speed or tempo variations causing the mentioned curved or warped traces in the CRP plot are considered, the method comprises, for each zero of said discontinuity found at a determined point i, j, obtaining said value of said penalized accumulated result by:

- subtracting a determined value from the accumulated result of the prior sub-sequence at a point i−1, j−1 immediately before said zero,
- subtracting a determined value from the accumulated result at a point i−2, j−1 of a sub-sequence of a second time sequence,
- subtracting a determined value from the accumulated result at a point i−1, j−2 of a sub-sequence of a third time sequence, and
- selecting, from among said three results and a value equal to zero, the one having a maximum value as said value of said penalized accumulated result.

To implement said most preferred case, the method proposed by the present invention comprises computing a cumulative plot Q from the CRP plot.

Initialize $Q_{1,j}=Q_{2,j}=Q_{i,1}=Q_{i,2}=0$ for i=1, . . . , $N_x$ and j=1, . . . , $N_y$, and then recursively apply:

$$Q_{i,j}=\begin{cases}\max\{Q_{i-1,j-1},\,Q_{i-2,j-1},\,Q_{i-1,j-2}\}+1 & \text{if } R_{i,j}=1\\ \max\{0,\,Q_{i-1,j-1}-\gamma(R_{i-1,j-1}),\\ \quad Q_{i-2,j-1}-\gamma(R_{i-2,j-1}), & \text{if } R_{i,j}=0\\ \quad Q_{i-2,j-2}-\gamma(R_{i-1,j-2})\}\end{cases} \quad (5)$$

for i=3, . . . , $N_x$ and j=3, . . . , $N_y$.

For one embodiment, the value to be subtracted from said accumulated results is one or the other depending on whether said point in which said subtraction occurs has a positive value or is equal to zero, i.e., that for a discontinuity formed by a series of zeros, different penalties will be applied depending on whether it is the initial zero of the discontinuity, i.e., it is preceded by a positive value, generally a one, or on whether the zero corresponding to a point i, j is preceded by another zero, this second case generally being more severely penalized than the first, so that the shorter discontinuities affect the measures of similarity performed less negatively.

The different values or penalties to be subtracted can be expressed as follows:

$$\gamma(z)=\begin{cases}\gamma_o & \text{if } z=1\\ \gamma_e & \text{if } z=0\end{cases} \quad (6)$$

where $\gamma_o$ corresponds to the onset of a disruption, i.e., an initial zero, and $\gamma_e$ to an extension of a disruption, i.e., a zero which is not the initial one.

The zero in the second clause of the equation (5) is used to prevent these penalties from causing a negative input of Q. It must be observed that for $\gamma_o$, $\gamma_e\to\infty$, equation (5) becomes equation (4).

Similarly to $L_{max}$ and $S_{max}$, the method proposed by the invention comprises a new recurrence quantification analysis measure parameter $Q_{max}$, which can be expressed as the maximum value of the cumulative plot Q, i.e.:

$$Q_{max}=\max\{Q_{i,j}\} \text{ for } i=1,\ldots,N_x \text{ and } j=1,\ldots,N_y,$$

the value of which corresponds to the length, or accumulated result, of the potentially most briefly interrupted and longest curved trace or sub-sequence in the CRP plot.

The method comprises, depending on the embodiment, calculating $S_{max}$ and $Q_{max}$ for the purpose of obtaining two representative values of the similarity between the two signals studied, or only calculating $Q_{max}$ which, as has been already been indicated, represents an improvement of $S_{max}$ since it considers both the speed variations and the disruptions or discontinuities in the sequences of the CRP plot.

For the latter case in which only $Q_{max}$ is calculated, it implements stage f) described above, i.e., the selection of the maximum accumulated result, the sums which offer the accumulated results of stage e) being carried out for each sub-sequence after a discontinuity, starting from the accumulated value in the prior sub-sequence (belonging to the same sequence, or diagonal, or to other parallel sequences or diagonals) duly penalized as has been described.

Depending on the embodiment, each of the two signals X, Y compared by means of the proposed method are two sections of one and the same time-variable signal, or two independent signals.

The method comprises using the data $x_i$ and $y_j$, in a state space or in a temporal space.

For one embodiment, said two time signals contain music information, generally being audio signals, where said extracted data $x_i$ and $y_j$ are relative to the different values which said audio signals take over time, or to time series of one or more descriptors representative of one or more characteristic aspects of said audio signals X and Y, which reflect the temporal evolution of a characteristic musical aspect of said audio signals X, Y.

A particular case of application of the proposed method, where the signals X, Y are two audio signals, considered of great interest by the present inventors, and for which a number of tests have been performed, is the one referring to the detection of performances or versions, or covers, of one and the same musical piece.

A section below will describe an embodiment referred to said detection of covers, where vectors constructed in the state space from the information (referring to numerous classes) existing in a time sequence of the known HPCP tonal descriptor have been used as data $x_i$ and $y_j$.

For another embodiment, the two time signals X, Y contain information referring to the temporal evolution of physiological and/or neurological signals, such as those obtained by means of electroencephalograms, electrocardiograms, etc., or of any other class of signal of interest in the field of medicine.

According to another alternative embodiment, the proposed method is applied to the calculation of measures of similarity between time signals containing information referring to the temporal evolution of study parameters of other fields, such as economy, climatology, bioinformatics, geophysics, etc.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The previous and other advantages and features will be more fully understood from the following detailed description of embodiments with reference to the attached drawings, which must be considered in an illustrative and non-limiting manner, in which.

DETAILED DESCRIPTION OF SEVERAL EMBODIMENTS

A known case in which the methods for calculating measures of similarity are applied is the one referring to music information retrieval, or MIR, and particularly to the detection of cover versions, or alternative performances of a previously recorded song. Given that such performances can differ from their originals in several musical aspects, it is a rather difficult task to determine them automatically.

In the embodiments described in the present section the method proposed by the present invention has been applied to the measure of similarity between songs, and specifically to the detection of covers.

Figure 1:
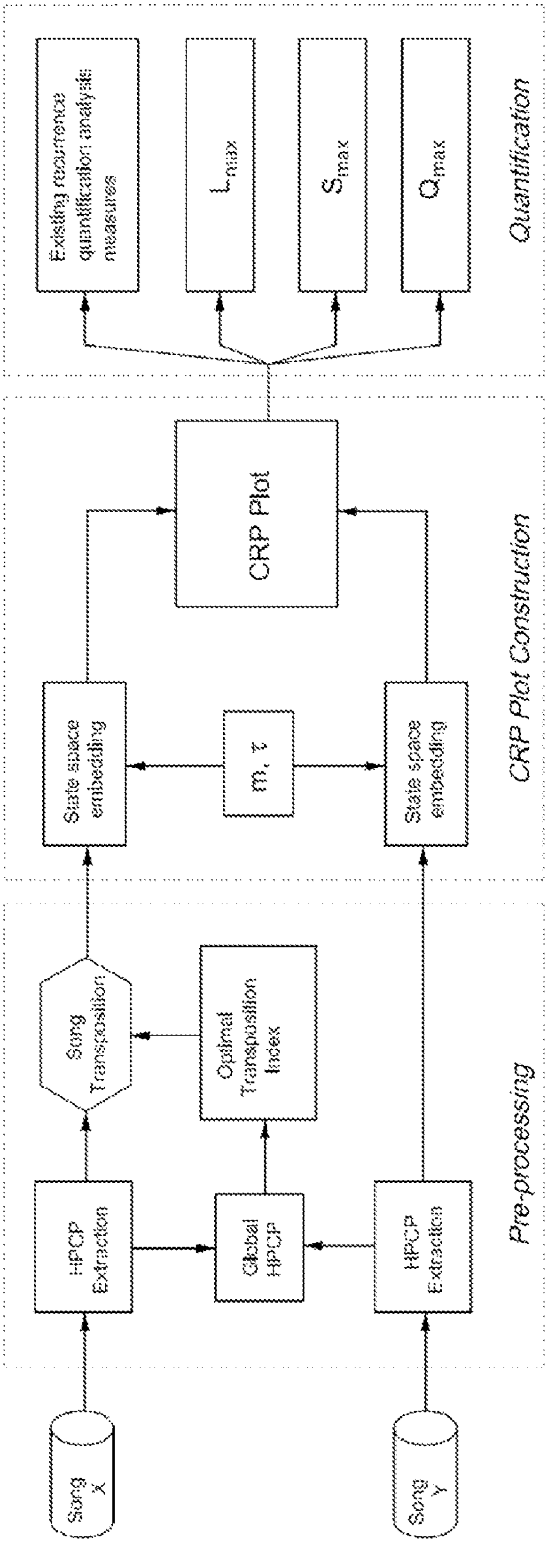
FIG. 1 is a general block diagram illustrating the different stages to be performed for calculating measures of similarity between two time signals, for one embodiment for which such time signals are two respective songs, the diagram including conventional stages and the stages proposed by the present invention.

With reference to FIG. 1, it indicates different known stages used to construct a CRP plot, and different quantification analysis measure parameters or stages of said CRP plot, some of which are known and others proposed by the present invention, particularly $S_{max}$ and $Q_{max}$.

The mentioned conventional stages have been indicated in said FIG. 1 for the purpose of explaining an embodiment of the method proposed by the invention applied to a CRP plot constructed with specific parameters, to measure the similarity between two songs X and Y, for the purpose of detecting if one is a cover of the other one, i.e., an alternative performance of one and the same song.

In relation to the pre-processing stage, it is considered that the tonal sequence is the most important characteristics shared between covers and original songs. The HPCP (harmonic pitch class profiles) tonal descriptor has particularly been used in the embodiments described in the present section, as it is considered the most suitable one for the detection of covers.

The same HPCP extraction process described in "J. Serrà, E. Gómez, P. Herrera, and X. Serra, IEEE Trans. on Audio, Speech and Language Processing 16, 1138 (2008)" has been used, but using twelve bins instead of thirty-six.

The computation of the HPCP descriptors in a mobile sampling window results in a multi-dimensional time series x for each song, its temporal tonal evolution being expressed as follows: $x=\{x_{h,i}\}$ for h=1, . . . , H and i=1, . . . , $N_x^*$, where H=12 is the number of HPCP bins and $N_x^*$ represents the total number of windows.

Figure 2:
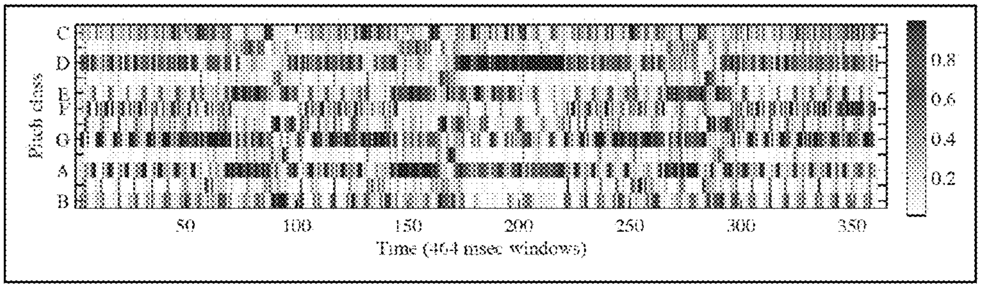
FIG. 2 shows a sequence of the extracted HPCP music descriptor, using a mobile sampling window, of the song "Day Tripper" performed by "The Beatles"

FIG. 2 illustrates an HPCP sequence of 350 windows extracted by using a window with a duration of 464 ms.

The last step of the pre-processing stage, indicated in FIG. 1, consists of transposing an HPCP sequence to the main key of the other one, due to the fact that a change in the main key or tonality is a common alteration when musicians perform versions of a known song. In the representations of HPCP sequences a change in the main tonality is represented by a circular shift in the pitch class. Consequently, this change can be reversed by using a suitable circular shift of the pitch class bins along the vertical axis of the HPCP sequence (for example, to transpose the sequence illustrated by FIG. 2 from D to C, the pitch class bins must be circularly shifted up by two bins, i.e., two semitones, for all the windows).

To determine the number of bins the optimal transposition index process proposed in "J. Serrà, E. Gómez, P. Herrera, and X. Serra, IEEE Trans. on Audio, Speech and Language Processing 16, 1138 (2008)" and extended in "J. Serrà, E. Gómez, and P. Herrera, IEEE CS Conference on The Use of Symbols to Represent Music and Multimedia Objects pp. 45-48 (2008)" has been used.

Once the pre-processing stage is complete, to construct the CRP plot, a state space embedding is performed.

To that end, it must be taken into account that an HPCP sequence is a multivariate representation of the temporal tonal evolution of a given song X or Y. Certainly, it does not represent a signal measured from a dynamic system described by any equation of motion. Nevertheless, delay coordinates, a tool derived from the theory of dynamic systems which is commonly used in nonlinear time series analysis, can be pragmatically used to facilitate the extraction of information contained in an HPCP sequence x, of the song X indicated in FIG. 1 (likewise for the HPCP sequence y, i.e., of the song Y). By means of evaluating sampling sequence vectors, the delay coordinates particularly allow evaluating recurrences between systems in a more reliable manner than by only using scalar samples.

Such use of sequences of notes, instead of isolated notes, is essential in music, particularly for perceiving and recognizing melodies.

Considering the temporal evolution of each individual pitch class, a vector sequence x in the delay coordinate state space has been constructed, where $x=\{x_i\}$ for i=1, . . . , $N_x$, with $N_x=N_x^*-(m-1)\tau$ and $$x_i=(x_{1,i},x_{1,i+T}, \ldots ,x_{1,i+(m-1)T},x_{2,i},x_{2,i+T}, \ldots x_{2,i+(m-1)T}, \ldots x_{H,i},x_{H,i+T}, \ldots x_{H,i+(m-1)T}), \quad (1)$$

where m is the so-called embedding dimension, and τ is the time delay. It is known that for a nonlinear time series analysis, a correct choice of m and τ is crucial for extracting significant information from noisy signals of finite length.

Although there are proposals for calculating optimal fixed values of m and τ (for example, the false nearest neighbors method and the use of the decay time autocorrelation function), to carry out the embodiments described in the present section the precision in the identification of covers of songs has been studied under the variation of these parameters and the selection of the best possible combination.

To construct the CRP plot, in stage b) of the proposed method, the data $x_i$, as defined in expression (1), have been compared with the likewise defined data $y_j$, i.e., corresponding vector sequences in the delay coordinate state space, relative to the HPCP descriptor, for various pitch classes.

Particularly, the values of said vector sequences $x_i$ and $y_i$ have been introduced in the expression (2), for different songs.

Figure 3:
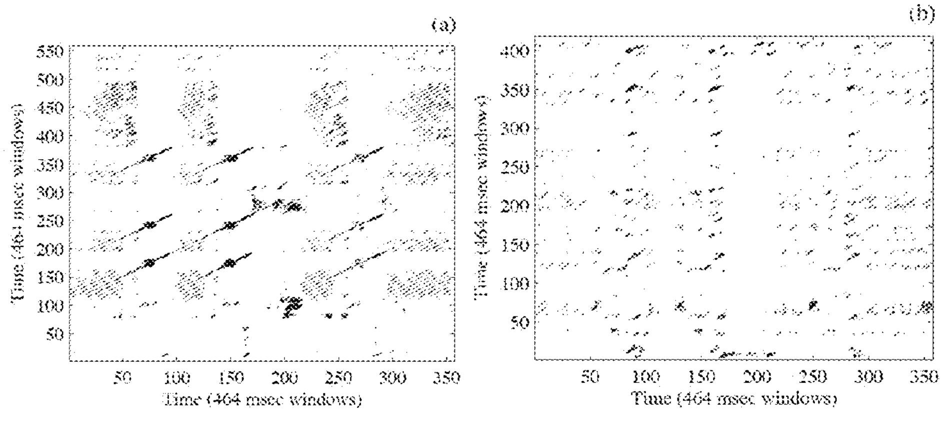
FIG. 3 shows respective CRP plots where the first signal X is the song "Day Tripper" performed by "The Beatles", and the second signal Y, in view (a), is a version of "Day Tripper" performed by the group "Ocean Colour Scene", and, in view (b), corresponds to the song "I've got a crush on you" performed by Frank Sinatra. The parameters used in said plots, and which will be described below, are m=9, τ=1 and k=0.08.

For the CRP plots illustrated by FIG. 3, vector sequences $x_i$ of the HPCP descriptor of the song "Day Tripper" performed by "The Beatles", and vector sequences $y_j$ of the HPCP descriptor of a version of "Day Tripper" performed by the group "Ocean Colour Scene" have been used for view (a). For view (b) the same sequence $x_i$ has been used, but the sequence $y_j$ corresponds to the song "I've got a crush on you" performed by Frank Sinatra. The parameters used in both plots are m=9, τ=1 and k=0.08 (from which the threshold values or distances $\epsilon_i^x$ and $\epsilon_j^y$ have been adjusted).

It can be observed in said FIG. 3 how two CRP plots constructed from two songs, one of which is a cover of the other one, generally show clearly distinguished extended patterns in the form of sub-sequences or traces (view (a)), whereas pairs of unrelated songs generally offer as a result a CRP plot which does not exhibit any evident structure (view (b)).

The short discontinuities or disruptions which separate sub-sequences of one and the same sequence, i.e., which extend according to one and the same diagonal, as illustrated in view (a) of FIG. 3, are due to the fact that the musicians who have performed one of the songs have skipped a chord or part of the melody in their performance, or cover, of the other song, which disruptions are taken into account by means of $Q_{max}$, as has been explained above.

Various recurrence quantification analysis measures have been performed with the CRP plots created using different songs, for the purpose of comparing the results obtained with each of said measures.

The value of the conventional parameter $L_{max}$, as well as the one of those proposed according to the method of the present invention $S_{max}$ and $Q_{max}$, have particularly been obtained from the cumulative matrices L, S and Q, constructed according to the expressions (3), (4) and (5), respectively, described above.

Figure 4:
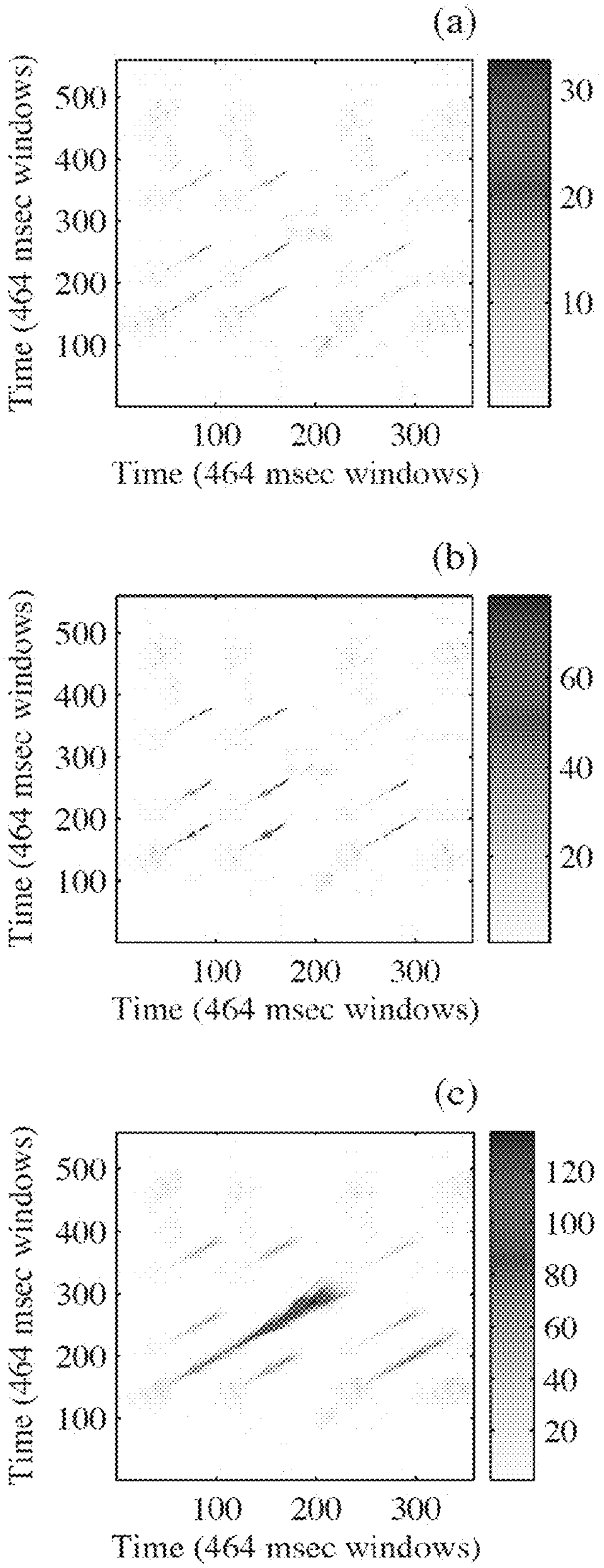
FIG. 4 shows three respective examples of cumulative matrices L (view (a)), S (view (b)) and Q (view (c)), at the right of which the respective associated levels of $L_{max}$, $S_{max}$ and $Q_{max}$ are depicted, for an embodiment for which the songs are the same as those used for the CRP plot of view (a) of FIG. 3, and the parameters of the CRP plots are the same as in FIG. 3, and where penalty parameters $\gamma_o=3$ and $\gamma_e=7$ have been used for plot Q.

Using the same data $x_i$ and $y_j$ which have been used to construct the plot of view (a) of FIG. 3, the three cumulative plots illustrated in FIG. 4 have been constructed, particularly plot L (view (a)), S (view (b)) and Q (view (c)), at the right of which the respective associated levels of $L_{max}$, $S_{max}$ and $Q_{max}$ have been depicted, for an embodiment for which the parameters of the CRP plots are the same as in FIG. 3, and where penalty parameters $\gamma_o=3$ and $\gamma_e=7$ have been used for plot Q.

It is necessary to emphasize the considerable increase in the maximum values between the different quantification measures. View (a) particularly shows $L_{max}=33$, or the highest accumulated result in a straight and continuous trace or sub-sequence starting at 140.232 s; view (b) shows $S_{max}=79$, or highest accumulated result in a curved and continuous trace starting at 216.142 s, and view (c) shows $Q_{max}=136$, or highest accumulated result in a curved or warped, in this case discontinuous, trace, starting at 14.118 s.

Figure 5:
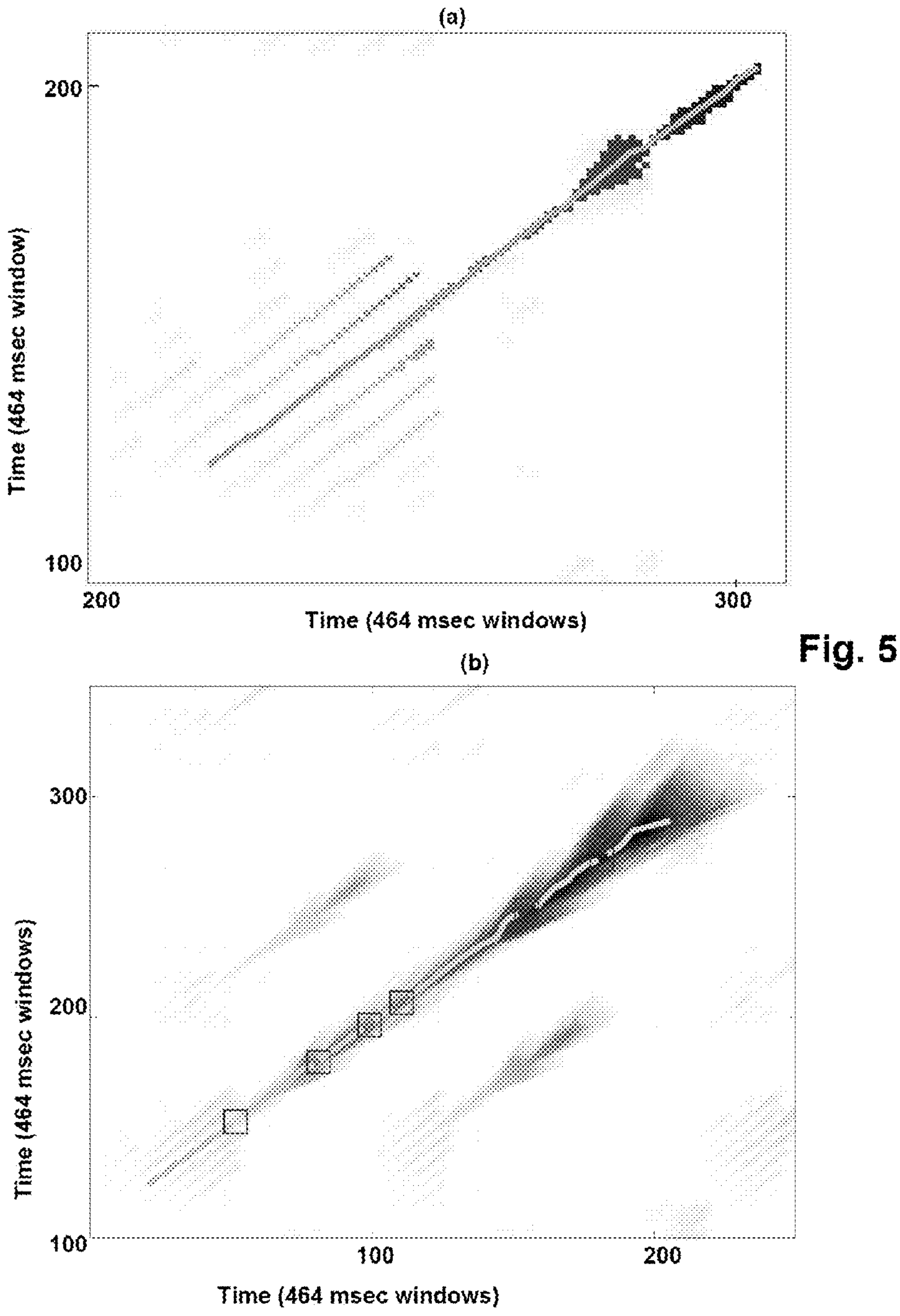
FIG. 5 shows two views (a) and (b) which correspond to enlarged details of part of the views (b) and (c), respectively, of FIG. 4, with the respective traces or sub-sequences of maximum accumulated value marked by means of lines drawn in said views (a) and (b)

FIG. 5 (*a*) depicts an enlarged detail of FIG. 4 (*b*), which shows the mentioned curved and continuous trace providing an $S_{max}=79$, marked with a gray line drawn on the different sub-sequences defining it.

FIG. 5(*b*) is likewise an enlarged detail of FIG. 4 (*c*), which shows the mentioned curved and discontinuous trace of maximum accumulated value providing a $Q_{max}=136$, indicated by means of a dotted gray line, drawn on the different sub-sequences defining it. The discontinuities in the drawn trace have been indicated by means of rectangles in said FIG. 5 (*b*).

In other words, according to $S_{max}$ and especially according to $Q_{max}$, the two songs analyzed, according to the embodiment illustrated by FIG. 4, are much more similar than indicated by $L_{max}$, which demonstrates the reliability of the method proposed by the present invention, since one of the two songs used is indeed a cover of the other song.

Embodiments relative to the evaluation of the method proposed by the present invention for an evaluation data set detailed below are described next with reference to FIGS. 6 to 9.

Evaluation Data:

To verify the effectiveness of the method proposed by the present invention with a larger number of songs than those used for the embodiments described up until now, in the present section a music collection including a total of one thousand nine hundred and fifty-three commercial songs with an average song length of 3.5 min, in a range from 0.5 to 7 min, has been analyzed. These songs include five hundred groups of versions, or covers, each of which refers to a group of versions of the same song. The average number of songs per group of versions is 3.9, in a range from two to eighteen songs per group of versions, which is graphically illustrated in FIG. 6 (*a*).

Figure 6:
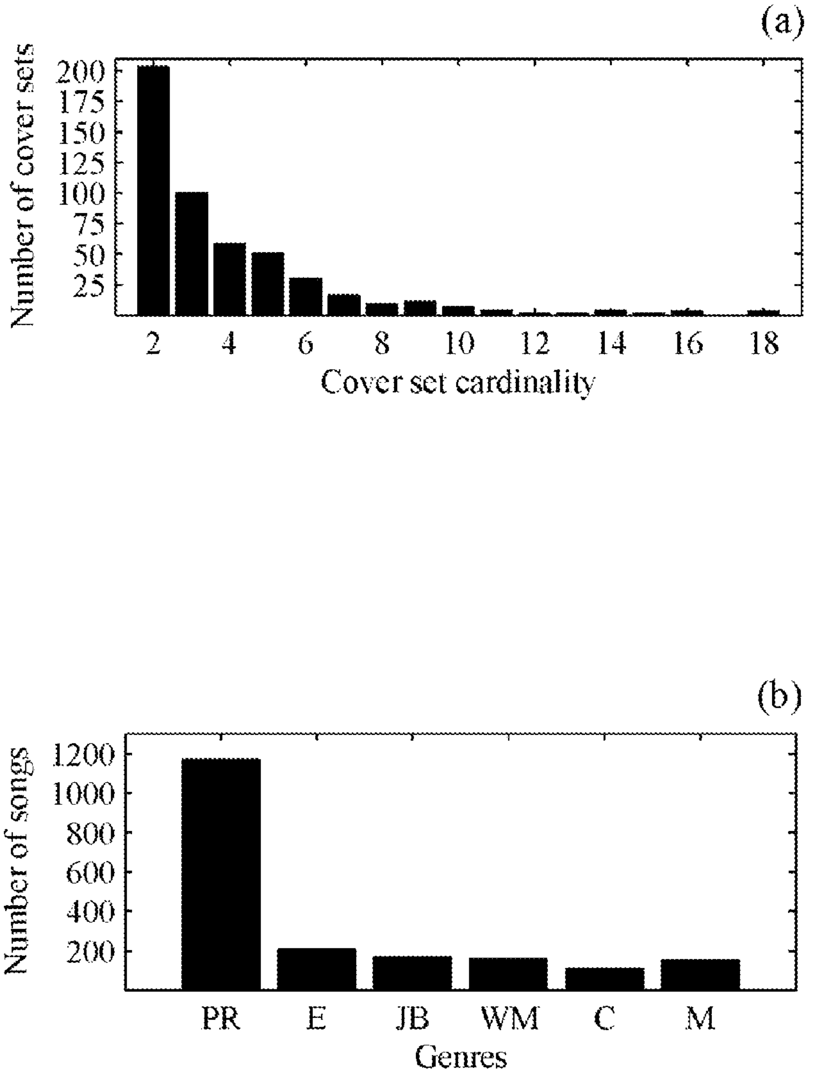
FIG. 6 illustrates two graphs referring to different distributions of songs of a music collection used to evaluate the method proposed by the present invention, where graph (a) illustrates the distribution of the number of songs by each group of versions of one and the same song, or cover sets, and view (b) illustrates the distribution of genres among all the songs, indicated by the abbreviations PR: pop-rock; E: electronic music; JB: jazz-blues; WM: world music; C: classical music; and M: miscellaneous.

The objective when forming this music collection was to include a large variety of music styles and genres, as illustrated in view (b) of FIG. 6, where five known genres are included, and a sixth genre referred to as "miscellaneous" where the songs which could not be classified into any of the other five genres are grouped. No other criterion for the inclusion or exclusion of songs has been applied. A complete list of the music collection can be found at http://mtg.upf.edu/people/jserra/. This music collection was compiled prior to and independently from the method proposed by the present invention (see J. Serrà, Master's thesis, Universitat Pompeu Fabra, Barcelona, Spain (2007), [Online]: http://mtg.upf.edu/node/536).

For the purpose of forming a training data set and several testing data sets, the total number of five hundred groups of versions was divided into three non-overlapping sub-groups. The training set contains ninety songs divided into fifteen groups of versions of six songs each. The first testing set contains three hundred and thirty songs divided into thirty groups of versions of eleven songs each. The second testing group contains the remaining four hundred and forty-five groups of versions, each of which contains between two and eighteen versions, resulting in a total of one thousand and thirty-three songs. An additional testing group was defined as the union of the first and the second testing groups.

Evaluation Methodology:

Given a collection of documents with D songs, $L_{max}$, $S_{max}$ and $Q_{max}$ have been calculated for all the possible combinations of pairs $$\frac{D(D-1)}{2}.$$

Once a similarity matrix has been computed as the main source of information, standard information retrieval measures have been used to evaluate the discriminatory power of this information. The so-called mean average precision measure, indicated as $\psi$, has been used. To calculate this measure, the similarity matrix is used to compute, for each song with index q, a list $\theta_q$ of D−1 songs sorted in decreasing order in relation to their similarity with the song q. Assuming that the query song q belongs to a group of versions comprising $C_q+1$ songs, the average precision $\omega_q$ is then obtained as:

$$\psi_q = \frac{1}{C_q}\sum_{r=1}^{D-1} P_q(r) I_q(r), \quad (7)$$

where $P_q(r)$ is the so-called precision of the list $\Lambda_q$ for the rank r, $$P_q(r) = \sum_{l=1}^{r} \frac{I_q(l)}{r}, \quad (8)$$

and $I_q(\bullet)$ is the so-called relevance function which fulfills that $I_q(z)=1$ if the song with rank z in the sorted list is a version or cover of q, and $I_q(z)=0$ in any other case. Therefore, $\psi_q$ varies between zero and one. If the cover songs take the first $C_q$ ranks, then $\psi_q=1$. Values close to zero are obtained if all the cover songs are found close to the end of $\Lambda_q$.

$\psi$ is calculated as the mean of the average precisions $\psi_q$ across all the queries q. This evaluation measure is commonly used in a large variety of tasks in the IR and MIR communities, including the identification of cover songs. Its use has the advantage of taking into account the complete sorted list where the correct elements with a low rank receive the largest weights.

Additionally, the expected level of precision has been estimated under the null hypothesis that the similarity matrix has no discriminatory power in relation to the assignment of groups of versions or covers. For such purpose, $\Lambda_q$ has been permuted and all the other steps remain the same. The process has been repeated nineteen times and taking the average for each song q, resulting in $\psi_{null}$. This $\psi_{null}$ can be used to estimate the precision of all the measures $L_{max}$, $S_{max}$ and $Q_{max}$ under the null hypothesis.

Results Obtained:

Optimization of Parameters:

The mentioned training data set has been used to study the influence of the embedding parameters m and $\tau$ and the percentage of nearest neighbors k in the precision measure $\psi$.

Figure 7:
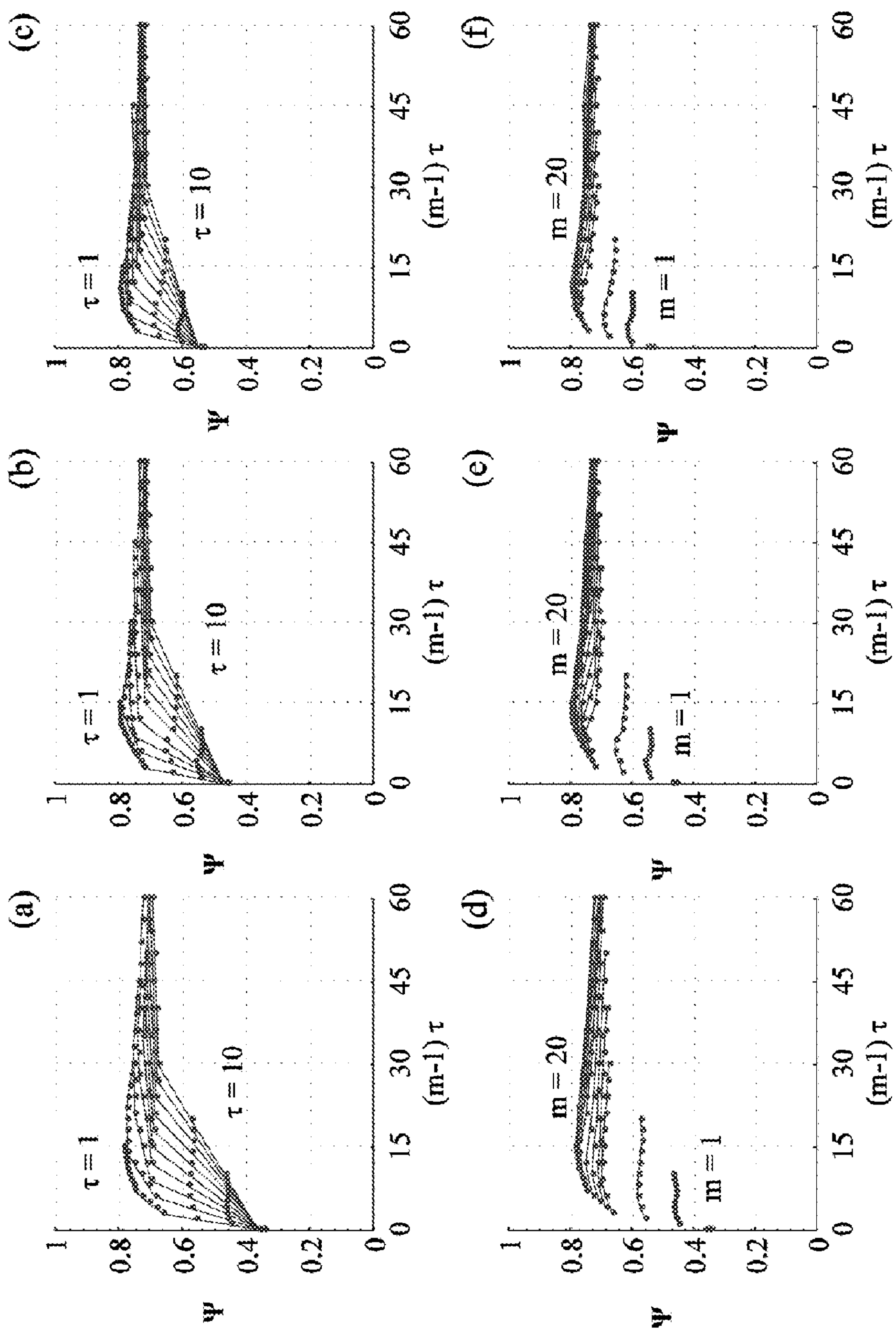
FIG. 7 shows several graphs referring to a precision measure parameter ψ for $Q_{max}$, varying different parameters, specifically views (a) to (c) show iso-τ curves (a-c), views (d) to (f) show iso-m curves, for k=0.05 (a, d), k=0.1 (b, e) and k=0.15 (c, f)
Figure 8:
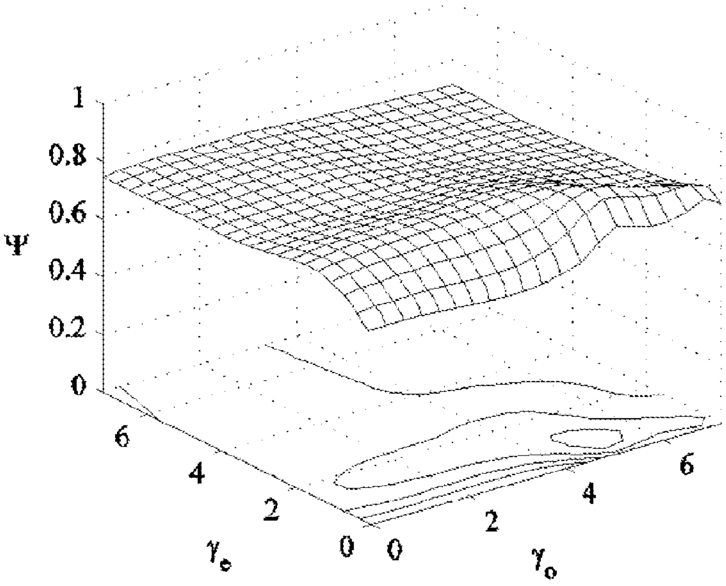
FIG. 8 is a graph which represents $\psi_{Qmax}$ as a function of $\gamma_o$ and $\gamma_e$.

FIG. 7 illustrates the results obtained for $Q_{max}$ which demonstrate that the use of an embedding (m>1) improves the precision of the system compared to the absence of said embedding (m=1). A broad peak of values close to the maximum of ψ has been established for a considerable range of embedding windows (approximately 7<(m−1)τ<17). It can seen in said FIG. 7 that, from these values close to the maximum, ψ decreases weakly upon further increasing the embedding window. Values of k between 0.05 and 0.15 have been found as optimal. Therefore, within these broad ranges of values relative to the embedding window (m−1)τ and to k, no fine tuning is required for any of the parameters to obtain a precision close to the optimal precision. Values of m=10, τ=1 and k=0.1 have been used below.

The precisions illustrated in FIG. 7 have been computed for a penalty $\gamma_o$ of the onset of a disruption and a penalty $\gamma_e$ of the extension of a disruption. The influence of these penalty parameters is illustrated in more detail in FIG. 8.

As has been indicated above, $\gamma_o$, $\gamma_e$ only affect $Q_{max}$, and when $\gamma_o, \gamma_e \rightarrow \infty$, the $Q_{max}$ measure is reduced to $S_{max}$, since equation (5) becomes equation (4). Using finite values for these terms, the precision generally increases, which discloses the advantage of $Q_{max}$ with respect to $S_{max}$. Values of precision for $Q_{max}$ close to the optimal have been found for $\gamma_o=5$ and $\gamma_e=0.5$.

The same optimization of parameters described above for $Q_{max}$ has been carried out separately for $L_{max}$ and $S_{max}$, and has resulted in m=10, τ=1 and k=0.1 also offer precisions close to the optimal precisions for these measures. No fine tuning has been necessary either, since the iso-τ and iso-m curves obtained for different values of k have shapes similar to those illustrated for $Q_{max}$ in FIG. 7.

Figure 9:
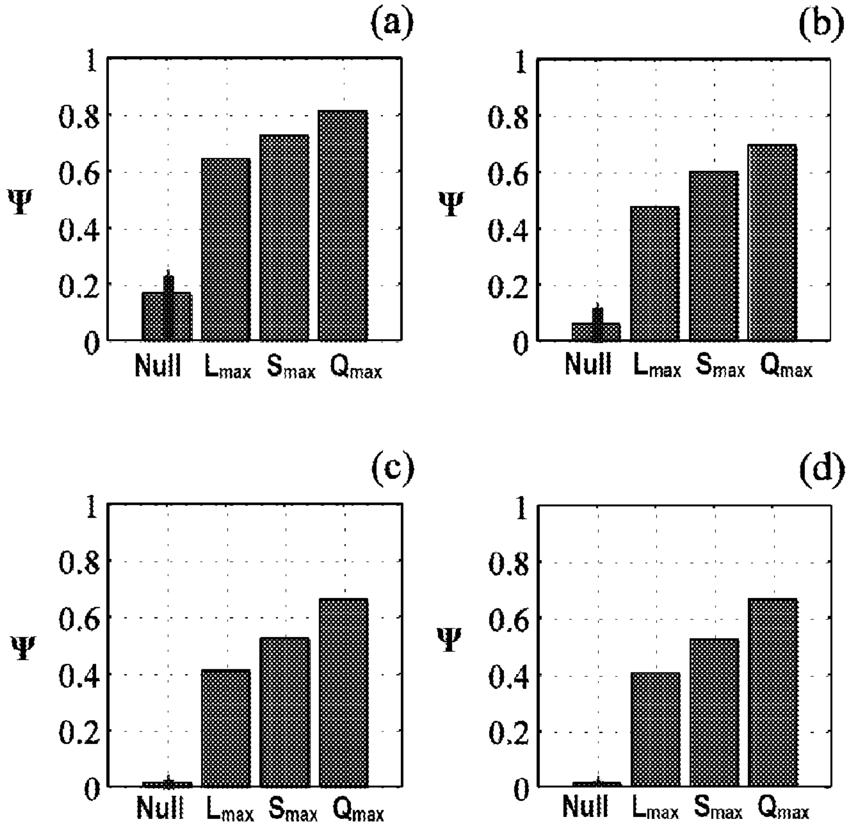
FIG. 9 shows different diagrams which indicate the average precision of the different recurrence quantification analysis measure parameters for a training data set (view (a)) and three test data sets (views (b)-(d)), including $L_{max}$, and those proposed by the present invention $S_{max}$ and $Q_{max}$; the error bars indicated as "Null" corresponding to the range throughout nineteen randomizations which will be described below.

For the training data, this "in-sample" optimization of parameters has led to the following precisions, illustrated in FIG. 9 (*a*): $\psi_{Lmax}=0.640$, $\psi_{Smax}=0.728$ and $\psi_{Qmax}=0.813$.

"Out-of-Sample" Precision:

The precisions for the testing data have also been calculated using the parameters determined by the optimization on the training data, and the results obtained are illustrated in FIGS. 9(*b*) to 9(*d*). The resulting average "out-of-sample" precisions were: $\psi_{Lmax}=0.426$, $\psi_{Smax}=0.543$ and $\psi_{Qmax}=0.667$.

These good "out-of-sample" precisions indicate that the results obtained cannot be due to an over-optimization of parameters. The increase in the precision achieved with the derivation of $L_{max}$ through $S_{max}$ to $Q_{max}$, is substantial. And, even more importantly, this increase in the precision, or accuracy, is also reflected in the testing data sets.

All the values for $L_{max}$, $S_{max}$, and $Q_{max}$ are significantly outside the range of $\psi_{null}$ across the nineteen randomizations. Therefore, the values of precision obtained are not consistent with the aforementioned null hypothesis which assumes that the similarity matrices do not have discriminatory power.

A person skilled in the art could introduce changes and modifications in is the embodiments described without departing from the scope of the invention as it is defined in the attached claims.

What is claimed is:

1. A method for calculating measures of similarity between time signals, comprising automatically performing the following stages: a) acquiring data of at least a first time-variable signal and data of a second time-variable signal, over at least part of the duration of each signal; b) comparing each of said data acquired from said first signal with at least a part of said data acquired from said second signal to evaluate the level of similarity between them; c) assigning a predetermined positive value to every two compared data if the result of said comparison is greater than a determined threshold, and a zero if it is less than said determined threshold, creating a data set with said positive values and said zeros ordered in time; d) determining at least a first time sequence with at least part of said is predetermined positive values and said assigned zeros of said data set, formed by a series of consecutive sub-sequences of positive values, separated by discontinuities formed by one or more zeros; e) obtaining a series of accumulated results for at least each of said consecutive sub-sequences, adding up the positive values included in at least each sub-sequence; and f) selecting the highest result from among said accumulated results obtained in said stage e), and establishing said selected result as indicative of the level of similarity between said two signals; wherein, to compensate possible differences in the speed of said signals, or in part of them, said stage e) comprises obtaining an accumulated result for each determined point i, j of a positive value, of each of said sub-sequences, adding said positive value to the accumulated result of maximum value, from among at least the following three accumulated results obtained in an analogous manner: an accumulated partial result at an immediately previous point i−1, j−1 of said sub-sequence, an accumulated result at a point i−2, j−1 of a sub-sequence of a second time sequence, and an accumulated result at a point i−1, j−2 of a sub-sequence of a third time sequence, wherein, for each sub-sequence starting after a discontinuity, the method comprises starting the operation of adding up its positive values which offers an accumulated result for said sub-sequence, independently of the accumulated result or results of one or more sub-sequences prior to said discontinuity.

2. A method for calculating measures of similarity between time signals, comprising automatically performing the following stages: a) acquiring data of at least a first time-variable signal and data of a second time-variable signal, over at least part of the duration of each signal; b) comparing each of said data acquired from said first signal with at least a part of said data acquired from said second signal to evaluate the level of similarity between them; c) assigning a predetermined positive value to every two compared data if the result of said comparison is greater than a determined threshold, and a zero if it is less than said determined threshold, creating a data set with said positive values and said zeros ordered in time; d) determining at least a first time sequence with at least part of said is predetermined positive values and said assigned zeros of said data set, formed by a series of consecutive sub-sequences of positive values, separated by discontinuities formed by one or more zeros; e) obtaining a series of accumulated results for at least each of said consecutive sub-sequences, adding up the positive values included in at least each sub-sequence; and f) selecting the highest result from among said accumulated results obtained in said stage e), and establishing said selected result as indicative of the level of similarity between said two signals; wherein, to compensate possible differences in the speed of said signals, or in part of them, said stage e) comprises obtaining an accumulated result for each determined point i, j of a positive value, of each of said sub-sequences, adding said positive value to the accumulated result of maximum value, from among at least the following three accumulated results obtained in an analogous manner: an accumulated partial result at an immediately previous point i−1, j−1 of said sub-sequence, an accumulated result at a point i−2, j−1 of a sub-sequence of a second time sequence, and an accumulated result at a point i−1, j−2 of a sub-sequence of a third time sequence, wherein, for each sub-sequence starting after a discontinuity, the method comprises starting the operation of adding up its positive values which offers an accumulated result for said sub-sequence, taking into account at least the accumulated result of a sub-sequence prior to said discontinuity.

3. The method according to claim 2, comprising starting the operation of adding up positive values which offers an accumulated result for said sub-sequence subsequent to a discontinuity, from a value of penalized accumulated result obtained upon applying at least one penalty to said accumulated result of is the prior sub-sequence, belonging to the same sequence as said subsequent sub-sequence or to another alternative time sequence.

4. The method according to claim 3, wherein said penalty comprises subtracting a determined value from said accumulated result of the prior sub-sequence.

5. The method according to claim 4, wherein for each zero of said discontinuity found at a determined point i, j, the method comprises obtaining said value of said penalized accumulated result by subtracting a determined value from at least the accumulated result of the prior sub-sequence, at a point i−1, j−1 immediately before said zero.

6. The method according to claim 5, wherein for each zero of said discontinuity found at a determined point i, j, the method comprises obtaining said value of said penalized accumulated result by: subtracting a determined value from the accumulated result of the prior sub-sequence at a point i−1, j−1 immediately before said zero, subtracting a determined value from the accumulated result at a point i−2, j−1 of a sub-sequence of a second time sequence, subtracting a determined value from the accumulated result at a point i−1, j−2 of a sub-sequence of a third time sequence, and selecting, from among said three results and a value equal to zero, the one having a maximum value as said value of said penalized accumulated result.

7. The method according to claim 6, wherein the value to be subtracted from said accumulated results is one or the other depending on whether said point at which said subtraction occurs has a positive value or is equal to zero.

8. The method according to claim 2, wherein each of said positive values is a unit value.

9. The method according to claim 2, wherein each of said two signals are two sections of one and the same time-variable signal.

10. The method according to claim 2, comprising using said data of said signals in a state space.

11. The method according to claim 2, comprising using said data of said signals in a temporal space.

12. The method according to claim 2, wherein said two time signals contain music information.

13. The method according to claim 12, wherein said two time signals are audio signals, said extracted data being relative to the different values which said audio signals take over time.

14. The method according to claim 12, wherein said two time signals are audio signals, said extracted data being relative to time series of one or more descriptors representative of one or more characteristic aspects of said audio signals, which reflect the temporal evolution of a characteristic musical aspect of said audio signals.

15. The method according to claim 12, wherein it is applied to the detection of performances or versions of one and the same musical piece.

16. The method according to claim 2, wherein said two time signals contain information referring to the temporal evolution of physiological and/or neurological signals.

17. The method according to claim 2, wherein said two time signals contain information referring to the temporal evolution of study parameters of at least one of the following fields: economy and climatology.

18. A method for calculating measures of similarity between time signals, comprising automatically performing the following stages: a) acquiring data of at least a first time-variable signal and data of a second time-variable signal, over at least part of the duration of each signal; b) comparing each of said data acquired from said first signal with at least a part of said data acquired from said second signal to evaluate the level of similarity between them; c) assigning a predetermined positive value to every two compared data if the result of said comparison is greater than a determined threshold, and a zero if it is less than said determined threshold, creating a data set with said positive values and said zeros ordered in time; d) determining at least a first time sequence with at least part of said is predetermined positive values and said assigned zeros of said data set, formed by a series of consecutive sub-sequences of positive values, separated by discontinuities formed by one or more zeros; e) obtaining a series of accumulated results for at least each of said consecutive sub-sequences, adding up the positive values included in at least each sub-sequence; and f) selecting the highest result from among said accumulated results obtained in said stage e), and establishing said selected result as indicative of the level of similarity between said two signals; wherein, to compensate possible differences in the speed of said signals, or in part of them, said stage e) comprises obtaining an accumulated result for each determined point i, j of a positive value, of each of said sub-sequences, adding said positive value to the accumulated result of maximum value, from among at least the following three accumulated results obtained in an analogous manner: an accumulated partial result at an immediately previous point i−1, j−1 of said sub-sequence, an accumulated result at a point i−2, j−1 of a sub-sequence of a second time sequence, and an accumulated result at a point i−1, j−2 of a sub-sequence of a third time sequence, wherein said threshold of said stage c) is a first determined threshold, applied to the comparison of the data of said two signals, taking as a reference those of the first signal, and in that it comprises a second determined threshold, applied to the comparison of the data of the two signals, taking as a reference those of the second signal, said assignment of a predetermined positive value being carried out every two compared data, if the result of at least one of said two comparisons is greater than its respective determined threshold.

19. The method according to claim 18, wherein said determined thresholds are adjusted such that a predetermined maximum percentage of near neighbors is used for both comparisons, the one taking the first signal as a reference and the one taking the second signal as a reference.

* * * * *